Nov. 6, 1928.

E. R. POWELL

PRESSURE GAUGE

Filed Oct. 29, 1920

1,690,245

INVENTOR
Edward Reed Powell
BY
Roy M. Eilers ATTORNEY

Patented Nov. 6, 1928.

1,690,245

UNITED STATES PATENT OFFICE.

EDWARD REED POWELL, OF ST. LOUIS, MISSOURI, ASSIGNOR, BY MESNE ASSIGNMENTS, TO HARVEY G. CRAIG, OF ST. LOUIS, MISSOURI.

PRESSURE GAUGE.

Application filed October 29, 1920. Serial No. 420,473.

The purpose of this invention is to provide a cheap, simple construction for a pressure gauge or pressure indicating device. While the improvements are particularly adapted to use in very low pressure gauges and for small pressure indicating devices subjected to all kinds of rough use, they may also be used for larger devices, of all pressures, and for devices of more delicate nature and purposes. The specific embodiment of the invention illustrated is especially designed for a dashboard pressure gauge for motor cars and is particularly adapted for use as a gasolene depth gauge by virtue of its accuracy at very low pressures. When used in this capacity it must be connected with a suitable air-trap and connecting tube, so that a quantity of gasolene may be indicated in terms of the hydrostatic head or pressure which various quantities of gasolene produce.

Figure 2:
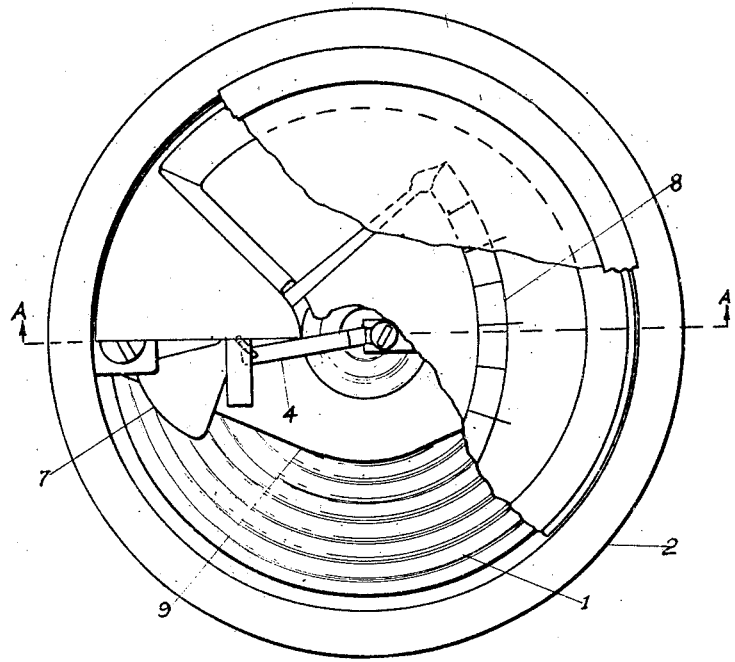
Figure 1:
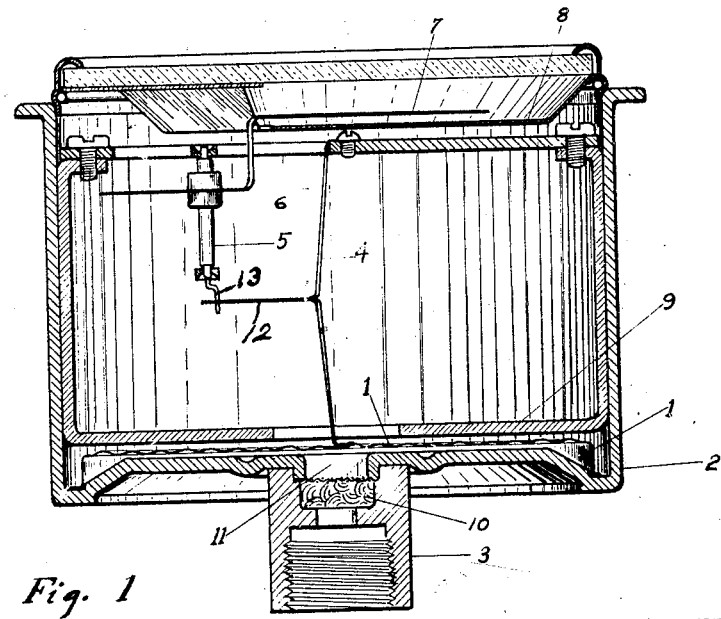

In the drawings, Figure 1 is a cross-sectional view of the gauge, and Figure 2 is a top view with a portion of the dial and glass removed to show the interior.

The gauge consists of a case 2, provided with a connection 3, to communicate with a source of pressure, the pressure fluid being introduced to the interior of the case through an opening 11. Within the case adjacent the opening 11 is a diaphragm 1, to which is attached one end of a spring toggle 4, the opposite end of which is attached to the frame 6 within the case 2. The spring toggle 4 is preferably made in the form of a strip of resilient material adapted to be flexed intermediate its ends upon application of pressure to the diaphragm. To facilitate operation of the toggle and insure flexure in the right direction the resilient member may be slightly bowed, as shown in the drawing. The return of the member 4 to normal position is independent of the elasticity of the diaphragm, its own elasticity causing it to resume its normal position when pressure is withdrawn from the diaphragm, even though the diaphragm may possess only enough elasticity to bring itself back to normal.

At its point of flexure the toggle 4 is connected by a member 12 with a crank arm 13, on the end of a spindle 5, rotatably supported from the frame 6. On the upper end of the spindle is a hand 7, visible from the face of the instrument and adapted to free rotative movement over a dial 8.

The extent of movement of the diaphragm 1 is limited by means of a rigid stop member 9, secured to the case 2, and the rate of flow of fluid through the opening 11 is restricted by suitable porous material 10, inserted in the connection 3.

In the operation of the device the pressure which it is desired to indicate is applied at the opening 11. The pressure causes a deflection of the diaphragm 1 and this in turn causes a larger movement of the toggle 4, which is transmitted to the crank arm 13 through the connecting member 12, to rotate the spindle and move the indicator hand 7 over the dial 8. In this way relative pressures are shown by the position of the hand with regard to the dial and the amount of pressure may be accurately indicated when once the sensitiveness of the device is known and indicated on the dial.

The diaphragm 1 is protected from sudden pulsations of pressure by the porous material 10 which allows the fluid to pass in and out of the pressure chamber opening 11 only slowly. The diaphragm is also protected from abuse, such as excessive pressure or vacuum, by the rigid stop member 9 and a protrusion in the case 2.

Glass and other suitable means are provided to protect the instrument from dust and corrosion and yet allow the position of the indicating hand to be readily seen.

I claim:

1. In a pressure gauge, a pressure-sensitive member, a pressure-indicating member, a bowed spring fixed at one end and having its other end contacting with said pressure-sensitive member, said bowed spring being adapted to be flexed intermediate its ends by movement of said pressure-sensitive member, and means connecting said pressure-indicating member to said bowed spring intermediate its ends for transmitting the flexing movement of said bowed spring to said pressure-indicating member.

2. In a pressure gauge, a casing having a fluid inlet, a diaphragm adapted to be flexed by pressure of fluid in said casing, a bowed spring connected at one end to said casing and having its opposite end contacting with said diaphragm, a rotatable pressure indicator, and means connecting said indicator to said spring between said points of contact for rotating said indicator in accordance with the degree of flexure of said diaphragm.

3. In a pressure gauge, a casing having a fluid inlet, a flexible diaphragm in said casing, a bowed spring connected at one end to said casing and having its opposite end contacting with said diaphragm, said bowed spring being adapted to be flexed intermediate its ends by movement of said diaphragm, a pressure-indicator, and means connecting said indicator to said bowed spring substantially midway between its ends for actuating said indicator in accordance with the degree of flexure of said bowed spring.

4. In a pressure gauge, a casing having a fluid inlet, a flexible diaphragm in said casing, a bowed spring connected at one end to said casing and having its opposite end contacting with said diaphragm and adapted to be flexed by movement of said diaphragm, a rotatable pressure-indicator, a crank arm for rotating said indicator, and means connecting said crank arm to said bowed spring substantially midway between its points of contact with said casing and diaphragm, whereby said indicator is actuated in accordance with the flexure of said diaphragm.

5. In a pressure gauge, a casing having a fluid inlet, a flexible diaphragm in the casing, a bowed spring connected at one end to the casing and having its opposite end adjacent the diaphragm and adapted to contact with and to be flexed by movement of the diaphragm, a pressure-indicating member, and means connecting the indicator with the bowed spring intermediate its ends to actuate the indicator in accordance with the degree of flexure of the spring.

6. In a pressure gauge, a pressure-sensitive member, a pressure-indicating member, a leaf spring fixed at one end and having its opposite end adjacent to and adapted to be engaged by said pressure-sensitive member, said spring being adapted to be flexed intermediate its ends by movement of said pressure-sensitive member, and means connected to said pressure-indicating member and engaging said spring intermediate its ends for transmitting the flexing movement of said spring to said pressure-indicating member.

EDWARD REED POWELL.